United States Patent
Maehara (10) Patent No.: US 10,343,461 B2
(45) Date of Patent: Jul. 9, 2019

(54) HEAVY DUTY PNEUMATIC TIRE

(71) Applicant: SUMITOMO RUBBER INDUSTRIES, LTD., Kobe-shi, Hyogo (JP)

(72) Inventor: Atsushi Maehara, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 638 days.

(21) Appl. No.: 14/923,694

(22) Filed: Oct. 27, 2015

(65) Prior Publication Data

US 2016/0137005 A1 May 19, 2016

(30) Foreign Application Priority Data

Nov. 18, 2014 (JP) .................................. 2014-233874

(51) Int. Cl.
  *B60C 11/11* (2006.01)
  *B60C 11/12* (2006.01)
  (Continued)

(52) U.S. Cl.
  CPC ...... *B60C 11/0327* (2013.01); *B60C 11/0306* (2013.01); *B60C 11/11* (2013.01);
  (Continued)

(58) Field of Classification Search
  CPC ... B60C 11/0306; B60C 11/11; B60C 11/125; B60C 11/1369; B60C 2011/0346;
  (Continued)

(56) References Cited

U.S. PATENT DOCUMENTS 5,120,209 A * 6/1992 MacMillan ........ B29D 30/0606
                                                    264/326
2006/0102267 A1* 5/2006 Takahashi ........... B60C 11/0306
                                                    152/209.18
(Continued)

FOREIGN PATENT DOCUMENTS

| JP | 2001-187517 | A | * | 7/2001 |
| JP | 2006-111091 | A | * | 4/2006 |
| JP | 2012-051504 | A | * | 3/2012 |
| JP | 2012-51504  | A |   | 3/2012 |

OTHER PUBLICATIONS

Machine translation for Japan 2012-051504 (Year: 2017).*
Machine translation for Japan 2006-111091 (Year: 2016).*
Machine translation for Japan 2001-187517 (Year: 2018).*

*Primary Examiner* — Steven D Maki
(74) *Attorney, Agent, or Firm* — Birch, Stewart, Kolasch & Birch, LLP (57) ABSTRACT

A heavy duty pneumatic tire includes a tread including a pair of central portions, a pair of middle portions and a pair of shoulder portions, wherein each of the portions has an axial width varying periodically while increasing and decreasing in a circumferential direction of the tire. Each of the central portions includes a central block with a hexagonal shaped top face and a central sipe. A total that is the sum of each maximum axial width of the central portions, each maximum axial width of the middle portions, each maximum axial width of the shoulder portions, a maximum axial length of the central sipe provided on one of the central portions, and a maximum axial length of the central sipe provided on the other one of the central portions is in a range of from 1.05 to 1.31 times a tread width.

17 Claims, 7 Drawing Sheets

(51) Int. Cl.
 *B60C 11/03* (2006.01)
 *B60C 11/13* (2006.01)

(52) U.S. Cl.
 CPC ........ *B60C 11/125* (2013.01); *B60C 11/1259* (2013.01); *B60C 11/13* (2013.01); *B60C 11/1369* (2013.01); *B60C 2011/0344* (2013.01); *B60C 2011/0346* (2013.01); *B60C 2011/0353* (2013.01); *B60C 2011/0365* (2013.01); *B60C 2011/0367* (2013.01); *B60C 2011/0376* (2013.01); *B60C 2011/1213* (2013.01)

(58) Field of Classification Search
 CPC ..... B60C 2011/0353; B60C 2011/0365; B60C 2011/0367; B60C 2011/1213
 See application file for complete search history.

(56) References Cited

U.S. PATENT DOCUMENTS

| | | | |
|---|---|---|---|
| 2011/0083777 A1* | 4/2011 | Hidrot | B60C 11/12 152/209.17 |
| 2011/0220261 A1* | 9/2011 | Matsuzawa | B60C 11/0306 152/209.23 |
| 2012/0241061 A1* | 9/2012 | Maehara | B60C 11/0306 152/209.22 |
| 2013/0240103 A1* | 9/2013 | Maehara | B60C 11/03 152/209.25 |
| 2015/0352903 A1* | 12/2015 | Ookawa | B60C 11/0306 152/209.18 |
| 2016/0185159 A1* | 6/2016 | Ookawa | B60C 11/04 152/209.18 |

\* cited by examiner

HEAVY DUTY PNEUMATIC TIRE

BACKGROUND OF THE INVENTION

Field of the Invention

The present invention relates to heavy duty pneumatic tires, and in particular, relates to a heavy duty pneumatic tire that may exhibit in excellent uneven wear resistance while ensuring wet performance.

Description of the Related Art

Japanese Unexamined Patent Application Publication No. 2012-51504 discloses a heavy duty pneumatic tire comprising a tread portion provided with a plurality of tread blocks separated by a circumferentially extending main groove and a plurality of lateral grooves. Such a tire tread tends to be generated uneven wear such as heel and toe wear on the respective tread blocks. In order to improve uneven wear resistance of the tread blocks, a heavy duty pneumatic tire provided with a tie-bar on the bottom of lateral grooves has been proposed. The tie-bar may reduce the amount of deformation of tread blocks when coming into contact with the road so as to reduce wear energy generated on the respective tread blocks.

Unfortunately, the lateral grooves may lose its drainage feature relatively early due to presence of the tie-bar when the tread portion wears. Thus, the wet performance of the heavy duty pneumatic tire having the tie-bar may deteriorate relatively early.

SUMMARY OF THE INVENTION

In view of the above problems in the conventional art, the present invention has an object to provide a heavy duty pneumatic tire that may exhibit in excellent uneven wear resistance while ensuring wet performance.

According to one aspect of the invention, a heavy duty pneumatic tire comprises a tread portion being provided with a circumferentially extending zigzag central main groove on a tire equator, a pair of circumferentially extending zigzag middle main grooves each located axially outwardly of the central main groove and a pair of circumferentially extending zigzag shoulder main grooves each located axially outwardly of each middle main groove to form a pair of central portions each between the central main groove and one of the middle main grooves, a pair of middle portions each between the middle main groove and the shoulder main groove on each side of the tire equator, and a pair of shoulder portions each between the shoulder main groove and a tread edge on each side of the tire equator, wherein each of the central portions, middle portions and shoulder portions has an axial width varying periodically while increasing and decreasing in a circumferential direction of the tire. Each of the central portions is provided with a plurality of central lateral grooves to form a plurality of central blocks each having a hexagonal shaped top face, wherein each of the central lateral grooves communicates a zigzag peak of the central main groove with a zigzag peak of the middle main groove so that each central lateral groove is arranged at a location where the central portion has a minimum width. Each of the middle portions is provided with a plurality of middle lateral grooves to form a plurality of middle blocks each having a hexagonal shaped top face, wherein each of the middle lateral grooves communicates a zigzag peak of the middle main groove with a zigzag peak of the shoulder main groove so that each middle lateral groove is arranged at a location where the middle portion has a minimum width. Each of the shoulder portions is provided with a plurality of shoulder lateral grooves to form a plurality of shoulder blocks each having a polygonal top face, wherein each of the shoulder lateral grooves communicates a zigzag peak of the shoulder main groove with the tread edge so that each shoulder lateral groove is arranged at a location where the shoulder portion has a minimum width. Each central block is provided with a central sipe extending in an axial direction of the tire. A total that is the sum of each maximum axial width of the central portions, each maximum axial width of the middle portions, each maximum axial width of the shoulder portions, a maximum axial length of the central sipe provided on one of the central portions, and a maximum axial length of the central sipe provided on the other one of the central portions is in a range of from 1.05 to 1.31 times a tread width.

In another aspect of the invention, the central sipe may have a depth in a range of from 80% to 96% of a depth of the middle main groove.

In another aspect of the invention, at lest one of the middle lateral grooves may have a bottom provided with a sipe, and the sipe may have a depth in a range of from 40% to 60% of a depth difference between the middle lateral groove and the middle main groove.

In another aspect of the invention, the central lateral grooves may have a depth greater than a depth of the middle lateral grooves, and the depth of the middle lateral grooves may be greater than a depth of the shoulder lateral grooves.

In another aspect of the invention, the central main groove may have a width smaller than a width of the middle main groove, and the width of the middle main groove may be smaller than a width of the shoulder main groove.

In another aspect of the invention, the middle main grooves may have an angle of from 2 to 8 degrees with respect to a circumferential direction of the tire.

In another aspect of the invention, each central main groove may comprise a long inclined portion and a short inclined portion inclined in an opposite direction to the long inclined portion, and the long inclined portion and the short inclined portion may be arranged alternately in a circumferential direction of the tire.

In another aspect of the invention, the zigzag peak of the middle main groove may comprise an outer peak that protruding axially outwardly, and at least one of the central sipe communicates the long inclined portion with the outer peak of the middle main groove.

In another aspect of the invention, each central lateral grooves may have a depth in a range of from 90% to 98% of a depth of the middle main groove, each middle lateral groove may have a depth in a range of from 68% to 84% of the depth of the middle main groove, and each shoulder lateral groove may have a depth in a range of from 16% to 32% of a depth of the shoulder main groove.

DESCRIPTION OF THE EMBODIMENTS

An embodiment of the present invention will be explained below with reference to the accompanying drawings. It should be noted that like elements are denoted by the same reference numerals throughout the disclosure.

Figure 1:
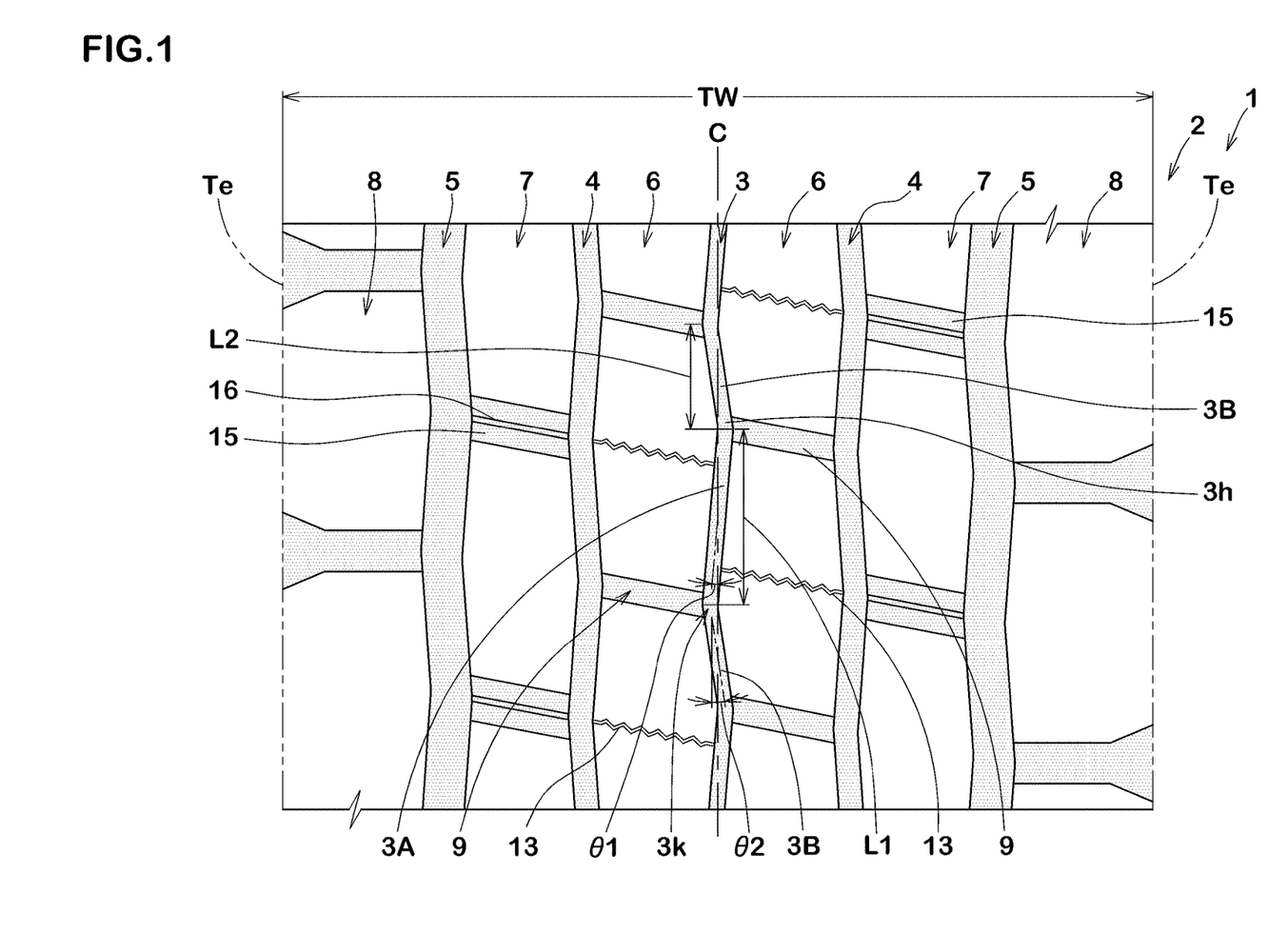
FIGS. 1 and 2 are development views of a tread portion of a heavy duty pneumatic tire in accordance with an embodiment of the present invention.

FIG. 1 illustrates a development view of a tread portion 2 of a heavy duty pneumatic tire 1 in accordance with an embodiment of the present invention. The heavy duty pneumatic tire 1, for example, may preferably be embodied as tires for trucks or buses.

As shown in FIG. 1, the tread portion 2 is provided with a plurality of circumferentially and continuously extending main grooves. In this embodiment, the main grooves include a central main groove 3 on a tire equator C, a pair of middle main grooves 4 and 4 each located axially outwardly of the central main groove 3 and a pair of shoulder main grooves 5 and 5 each located between one of the middle main grooves 4 and a tread edge Te.

In each side of the tire equator C, the tread edge Te refers to an axially outermost edge of the ground contacting patch of the tread portion 2 which occurs under a normally inflated loaded condition when the camber angle of the tire is zero. The normally inflated loaded condition is such that the tire 1 is mounted on a standard wheel rim with a standard pressure and loaded with a standard tire load.

The standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

The standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

In this application including specification and claims, various dimensions, positions and the like of the tire refer to those under a normally inflated unloaded condition of the tire unless otherwise noted. The normally inflated unloaded condition is such that the tire 1 is mounted on the standard wheel rim with the standard pressure but loaded with no tire load. The tread width TW is defined as the width measured under the normally inflated unloaded condition, as the axial distance between the tread edges Te and Te.

The central main groove 3 extends in a zigzag manner in the circumferential direction of the tire. In this embodiment, the central main groove 3 includes a long inclined portion 3A and a short inclined portion 3B inclined in an opposite direction to the long inclined portion 3A, and which are alternately arranged in the circumferential direction of the tire. The central main groove 3 may be useful to improve wet performance as well as uneven wear resistance.

The central main groove 3 includes a plurality of zigzag peaks each formed between the long inclined portion 3A and the short inclined portion 3B. In this embodiment, the zigzag peaks include a first peak 3h which protrudes the right side in FIG. 1 and a second peak 3k which protrudes the left side in FIG. 1.

Preferably, the long inclined portion 3A has an angle θ1 in a range of from 0.5 to 6.5 degrees with respect to the circumferential direction of the tire. Preferably, the short inclined portion 3B has an angle θ2 in a range of from 5 to 15 degrees with respect to the circumferential direction of the tire.

When the angle θ1 of the long inclined portion 3A exceeds 6.5 degrees or when the angle θ2 of the short inclined portion 3B exceeds 15 degrees, rigidity of a land portion around the first peak 3h or the second peak 3k may excessively lower. When the angle θ1 of the long inclined portion 3A is less than 0.5 degrees, or when the angle θ2 of the short inclined portion 3B is less than 5 degrees, wet performance may lower.

Preferably, the circumferential length L1 of the long inclined portion 3A is in a range of from 1.3 to 2.3 times the circumferential length L2 of the short inclined portion 3B in order to ensure rigidity of a land portion around the central main groove 3 so as to reduce slippage of the portion against the road during traveling.

Figure 2:
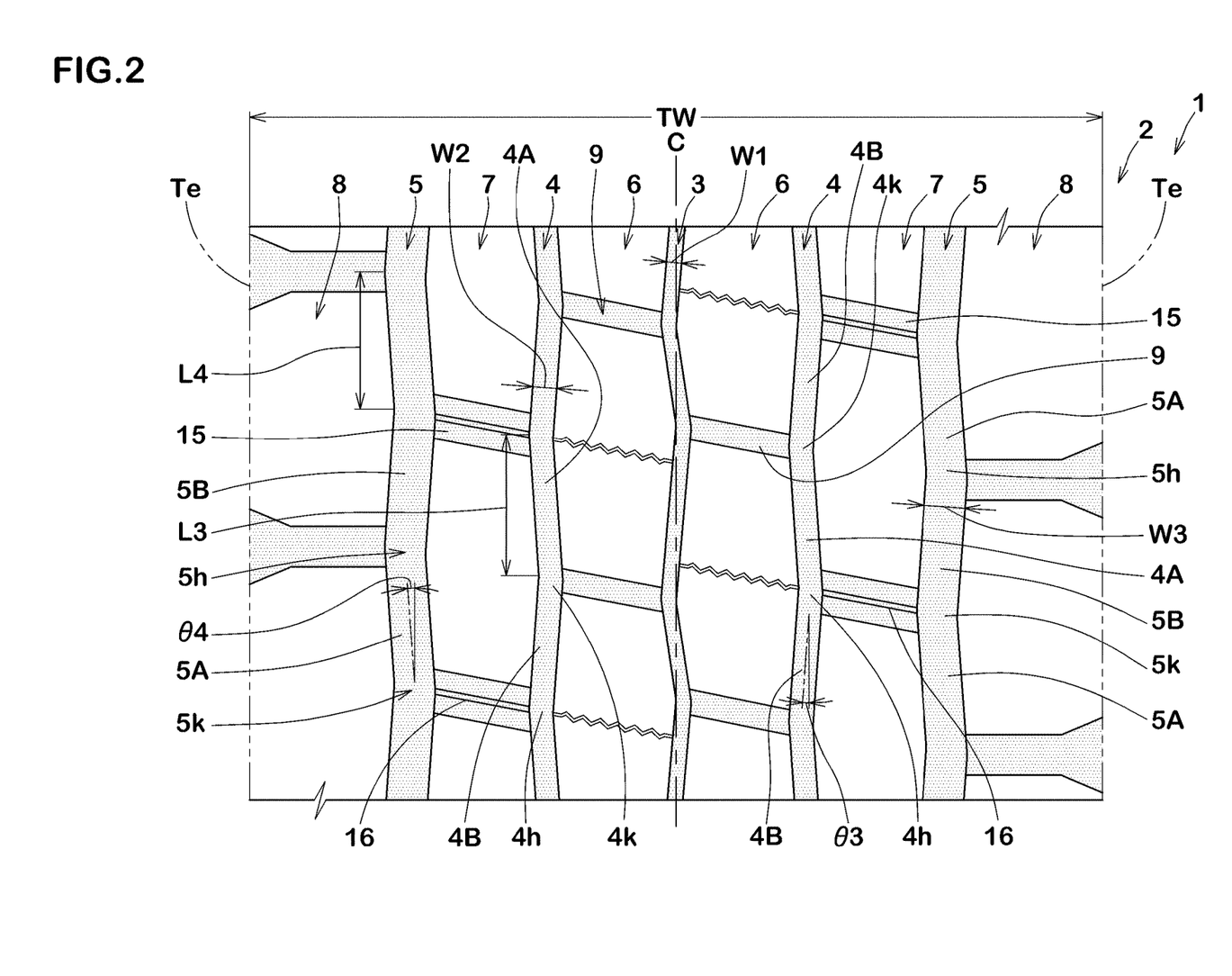

As shown in FIG. 2, the middle main groove 4 extends in a zigzag manner in the circumferential direction of the tire. In this embodiment, the middle main groove 4 includes a first inclined portion 4A and a second inclined portion 4B inclined in an opposite direction to the first inclined portion 4A, and which are alternately arranged in the circumferential direction of the tire. The first inclined portion 4A has a circumferential length same as that of the second inclined portion 4B to drain the water smoothly. Alternatively, the first inclined portion 4A may have a different circumferential length from that of the second inclined portion 4B.

The middle main groove 4 includes a plurality of zigzag peaks each formed between the first inclined portion 4A and the second inclined portion 4B. In this embodiment, the zigzag peaks include an outer peak 4h which protrudes axially outwardly and an inner peak 4k which protrudes axially inwardly.

Preferably, each of the first and second inclined portions 4A and 4B may have an angle θ3 in a range of from 2 to 8 degrees with respect to the circumferential direction of the tire. Such a middle main groove 4 may provide sufficient rigidity on the land portion around the groove 4 while ensuring excellent drainage performance.

In the same point of view, the respective circumferential lengths L3 of the first and second inclined portions 4A and 4B are preferably in a range of from 10% to 20% of the tread width TW.

The shoulder main groove 5 extends in a zigzag manner in the circumferential direction of the tire. In this embodiment, the shoulder main groove 5 includes a first inclined portion 5A and a second inclined portion 5B inclined in an opposite direction to the first inclined portion 5A, and which are alternately arranged in the circumferential direction of the tire. The first inclined portion 5A has a circumferential length L4 same as that of the second inclined portion 5B. Alternatively, the first inclined portion 5A may have a different circumferential length from that of the second inclined portion 5B. The shoulder main groove 5 may be useful to improve wet performance.

The shoulder main groove 5 includes a plurality of zigzag peaks each formed between the first inclined portion 5A and the second inclined portion 5B. In this embodiment, the zigzag peaks include an outer peak 5h which protrudes axially outwardly and an inner peak 5k which protrudes axially inwardly.

Preferably, each of the first and second inclined portions 5A and 5B may have an angle θ4 in a range of from 1 to 7 degrees with respect to the circumferential direction of the tire. Such a shoulder main groove 5 may provide sufficient axial rigidity with the land portion around the groove 5 to improve uneven wear resistance.

Preferably, the respective circumferential lengths L4 of the first inclined portion 5A and the second inclined portion 5B are set in a range of from 10% to 20% of the tread width TW in order to further improve advantageous effects described above.

Preferably, the shoulder main groove 5 may have a width W3 greater than the width W2 of the middle main groove 4. Furthermore, the middle main groove 4 may have the width W2 greater than the width W1 of the central main groove 3. Such a groove arrangement may enhance rigidity of the land portion around the tire equator C as compared with the land portions around the tread edges Te to improve wear resistance. Furthermore, the shoulder main groove 5 having a relatively large width may ensure drainage performance.

In view of above, the width W1 of the central main groove 3 is preferably in a range of from 0.5% to 3% of the tread width TW. Furthermore, the width W2 of the middle main groove 4 is preferably in a range of from 1.5 to 3.0 times the width W1 of the central main groove 3. In addition, the width W3 of the shoulder main groove 5 is preferably in a range of from 2.0 to 4.0 times the width W1 of the central main groove 3.

The respective depths of main grooves 3 to 5 are not limited but can be set in various depths. Preferably, the depths are in a range of from 10.0 to 16.5 mm.

By providing the respective main grooves 3 to 5, the tread portion 2 is separated into a pair of central portions 6 and 6, a pair of middle portions 7 and 7, and a pair of shoulder portions 8 and 8. Each of the central portions 6 is defined between the central main groove 3 and one of the middle main grooves 4. Each of the middle portions 7 is defined between the middle main groove 4 and the shoulder main groove 5 on each side of the tire equator C. Each of the shoulder portions 8 is defined between the shoulder main groove 5 and the tread edge Te on each side of the tire equator C.

Figure 3:
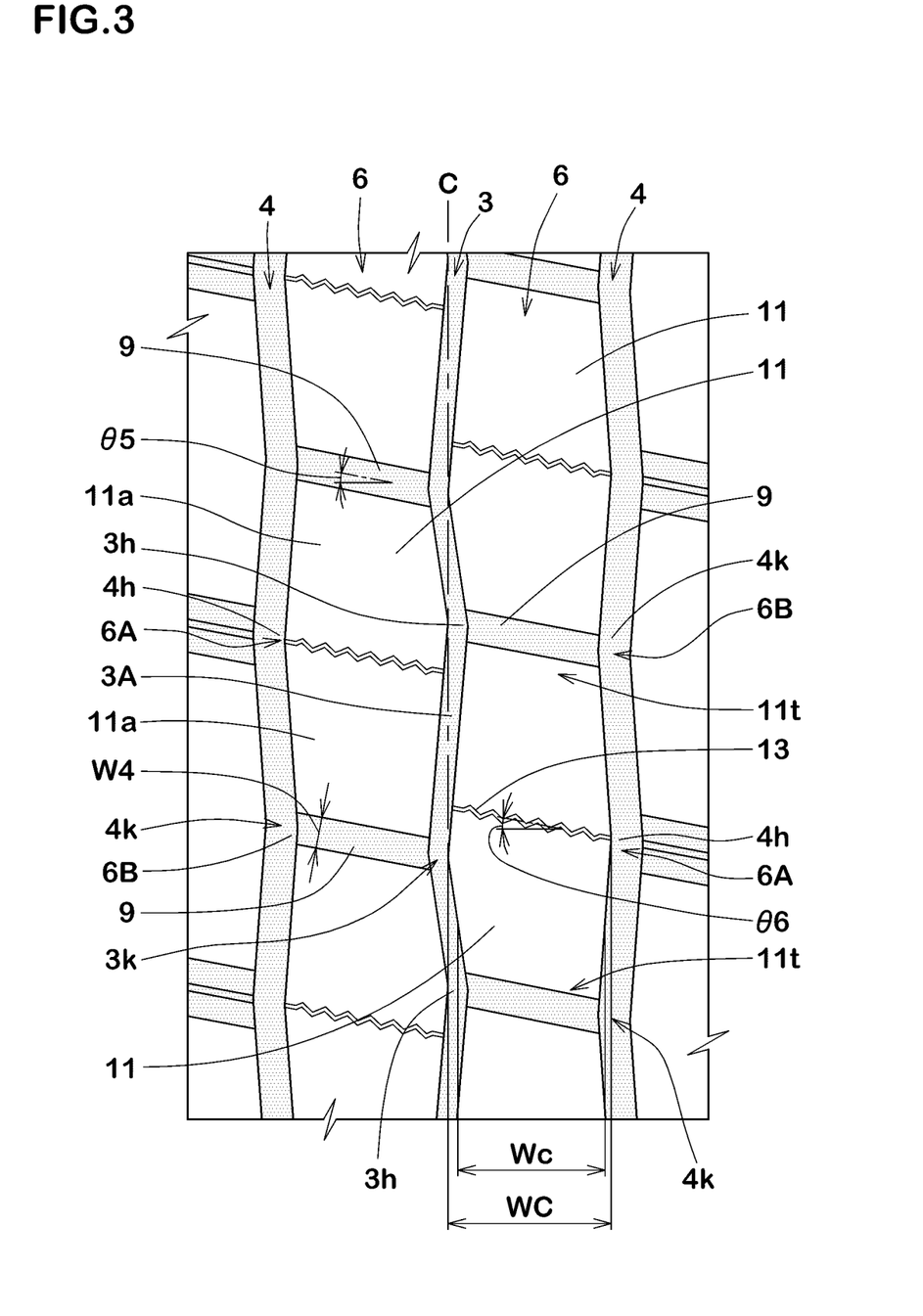
FIG. 3 is an enlarged view of a central portion illustrated in FIG. 1.

FIG. 3 illustrates an enlarged view of the central portion 6 of FIG. 1. Referring to FIG. 3, the central portion 6 has an axial width We that varies periodically while increasing and decreasing in the circumferential direction of the tire by shifting the zigzag phase of the central main groove 3 at approximately half of the pitch to the zigzag phase of the middle main groove 4.

The central portion 6 includes a maximum-width portion 6A and a minimum-width portion 6B which are alternately arranged in the circumferential direction of the tire. The maximum-width portion 6A has the maximum width of the central portion 6. The minimum-width portion 6B has the minimum width of the central portion 6.

The central portion 6 is provided with a plurality of central lateral grooves 9 to form a plurality of central blocks 11 each having a hexagonal shaped top face, wherein each of the central lateral grooves 9 communicates the first or second peak 3h or 3k of the central main groove 3 with the zigzag inner peak 4k of the middle main groove 4 so that each central lateral groove 9 is arranged at a location where the central portion 6 has the minimum width.

The central lateral grooves 9 may improve drainage performance by dispersing the water from under the central portion 6 toward the central main groove 3 or the middle main groove 4. In this embodiment, each of the central lateral grooves 9 extends in a straight manner and is inclined at an angle θ5 with respect to the axial direction of the tire to disperse the water toward either main groove 3 or 4 effectively by using rotation of the tire. When the angle θ5 is excessively large, rigidity of the central portion 6 around the central lateral groove 9 tends to be reduced. Preferably, the angle θ5 of the central lateral groove 9 is in a range of from 5 to 15 degrees.

Preferably, the central lateral groove 9 may have a width W4 in a range of from 1.5% to 4.5% of the tread width TW in order to ensure rigidity of the central portion 6 as well as drainage performance.

Figure 4:
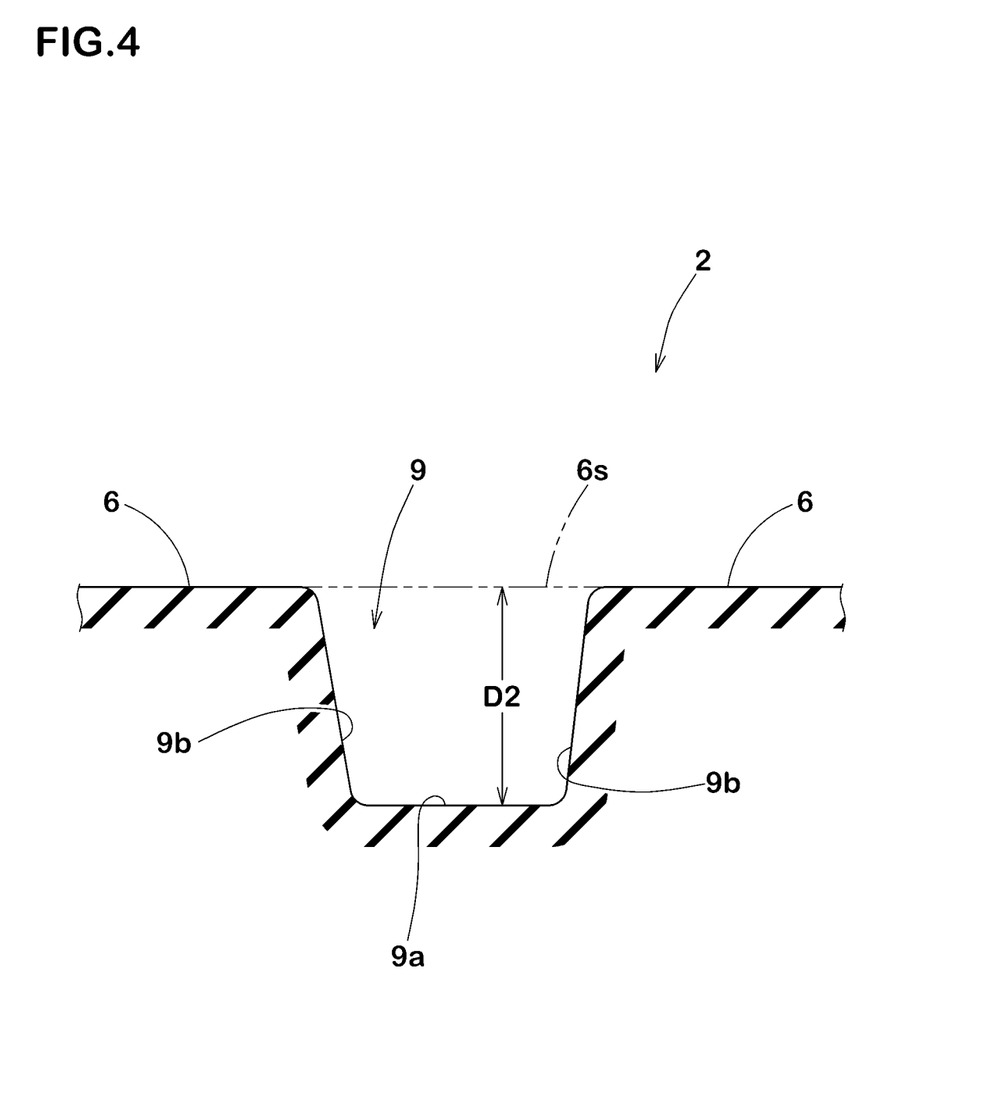
FIG. 4 is a cross sectional view of a central lateral groove.

FIG. 4 illustrates a cross-section of the central lateral groove 9. As shown in FIG. 4, the central lateral groove 9 includes a flat bottom 9a which extends in substantially parallel to the virtual top face 6s of the tread portion 2 and a pair of walls 9b and 9b. Here, the virtual top face 6s of the tread portion 2 is defined as a plane that bridges between both surfaces 6n through the central lateral groove 9. The shape of the bottom 9a of the central lateral groove 9 is not limited to the aspect of FIG. 4 but can be modified in any shapes.

In order to ensure drainage performance in long period of time, the depth D2 of the central lateral groove 9 is preferably in a range of from 90% to 98% of the depth D1 (shown in FIG. 6) of the middle main groove 4.

Referring back to FIG. 3, the central portion 6 is separated into a plurality of central blocks 11 each having a hexagonal shaped top face by the central lateral grooves 9. Such a central block shape may suppress slippage thereof against the road by elastically and moderately deforming each circumferential both end portion 11t of the central blocks 11 when the central block 11 comes into contact with the road. Accordingly, wear-energy to be acted on the respective end portions 11t of the central block 11 may be reduced so that uneven wear resistance is improved. Here, it should be understood that "the hexagonal shape" is not limited to a regular hexagonal shape but can include any shapes that have substantially six sides and an axial width varying in a tapered manner toward circumferentially both ends from its circumferential central region.

Each of the central blocks 11 is provided with a full opened central sipe 13 that communicates the central main groove 3 with the middle main groove 4. Thus, the central block 11 is separated into a pair of central block pieces 11a and 11a. In this embodiment, the central sipe 13 extends in a zigzag manner to be engaged the central block pieces 11a one another in the axial direction of the tire. Alternatively, as to the central sipe shape, a wavy or sine curved manner may be employed. The central sipe 13 may be useful to improve drainage performance while ensuring central block rigidity.

In this embodiment, the central sipe 13 communicates the long inclined portion 3A of the central main groove 3 with the outer peak 4h of the middle main groove 4 to keep a balance in rigidity between the central block pieces 11a and 11a.

Preferably, the central sipe 13 is inclined in the same direction as the central lateral grooves 9 with respect to the axial direction of the tire to keep a balance in rigidity between the central block pieces 11a and 11a. preferably, the angle θ6 of the central sipe 13 with respect to the axial direction of the tire is the same as the angle θ5 of the central lateral groove 9. When a sipe extends in a zigzag manner as shown in FIG. 3, the angle of the sipe should be defined using a center line of the zigzag amplitude.

In order to further improve the advantageous effects, the central sipe 13 may preferably have a depth in a range of not less than 80%, more preferably not less than 84%, but preferably not more than 96%, more preferably not more than 92% of the depth D1 of the middle main groove 4.

Figure 5:
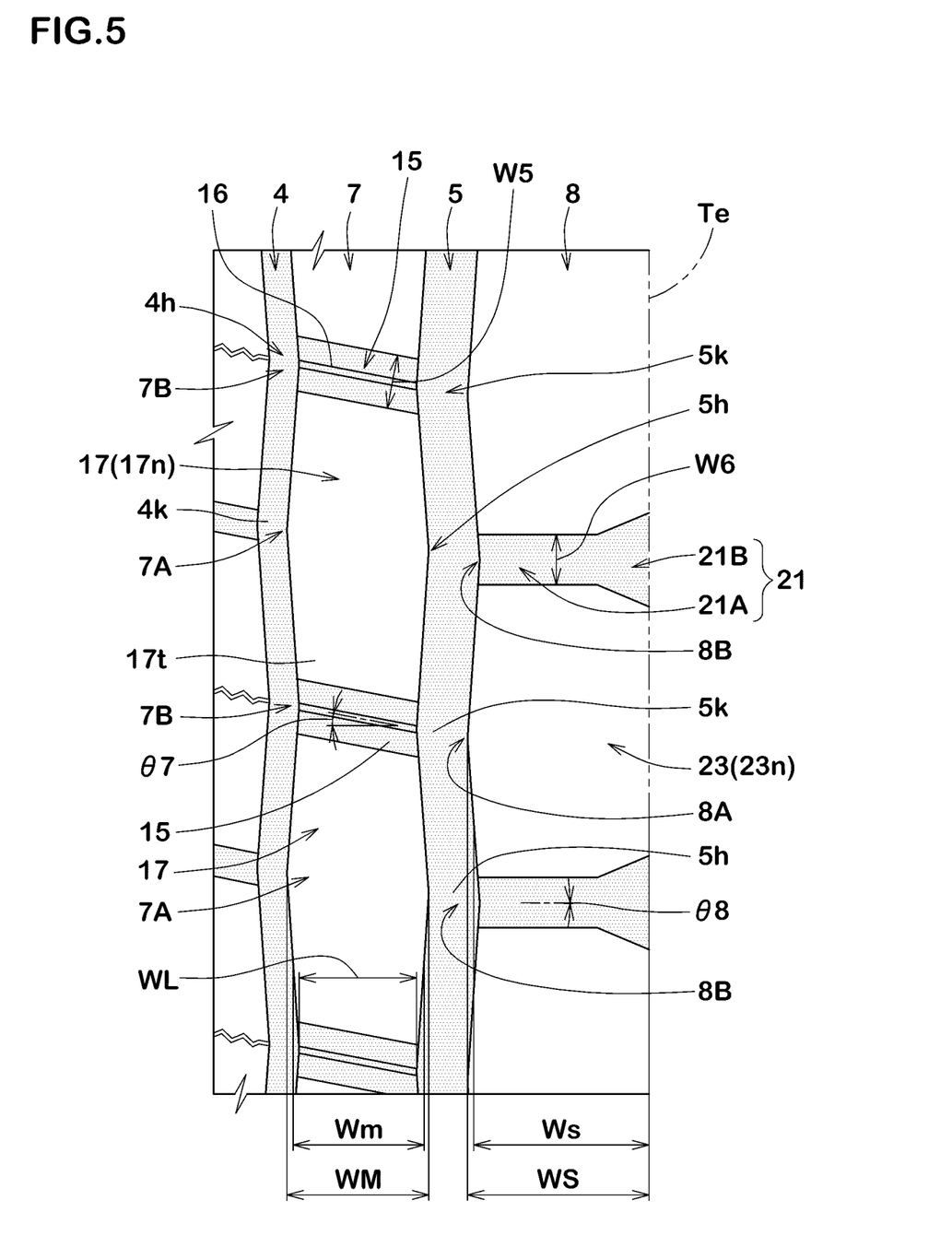
FIG. 5 is an enlarged view of the right side part of the tread portion of FIG. 1.

FIG. 5 illustrates an enlarged view of the right side part of the tread portion 2 of FIG. 1. As shown in FIG. 5, the middle portion 7 has an axial width Wm that varies periodically while increasing and decreasing in the circumferential direction of the tire by shifting the zigzag phase of the middle main groove 4 at approximately half of the pitch to the zigzag phase of the shoulder main groove 5.

The middle portion 7 includes a maximum-width portion 7A and a minimum-width portion 7B, and which are alternately arranged in the circumferential direction of the tire. The maximum-width portion 7A has the maximum width of the middle portion 7. The minimum-width portion 7B has the minimum width of the middle portion 7.

The middle portion 7 is provided with a plurality of middle lateral grooves 15 to form a plurality of middle blocks 17 each having a hexagonal shaped top face, wherein each of the middle lateral grooves 15 communicates the zigzag peak 4h of the middle main groove 4 with the inner peak 5k of the shoulder main groove 5 so that each middle lateral groove 15 is arranged at a location where the middle portion 7 has the minimum width.

The middle lateral grooves 15 may improve drainage performance by dispersing the water from under the middle portion 7 toward the middle main groove 4 or the shoulder main groove 5. In this embodiment, each of the middle lateral grooves 15 extends in a straight manner and is inclined at an angle θ7 with respect to the axial direction of the tire to disperse the water toward either main groove 4 or 5 effectively by using rotation of the tire.

Generally, relatively large ground contact pressure is acted on the central portion 6 as compared to the middle portion 7 during straight traveling ahead. In order to keep a balance in wear energy between the central portion 6 and middle portion 7, it is preferable that pattern rigidity of the central portion 6 is greater than that of the middle portion 7. Accordingly, the angle θ7 of the middle lateral groove 15 is preferably smaller than the angle θ5 (shown in FIG. 3) of the central lateral groove 9. In view of above, the angle θ7 of the middle lateral groove 15 is in a range of from 4 to 14 degrees.

Figure 6:
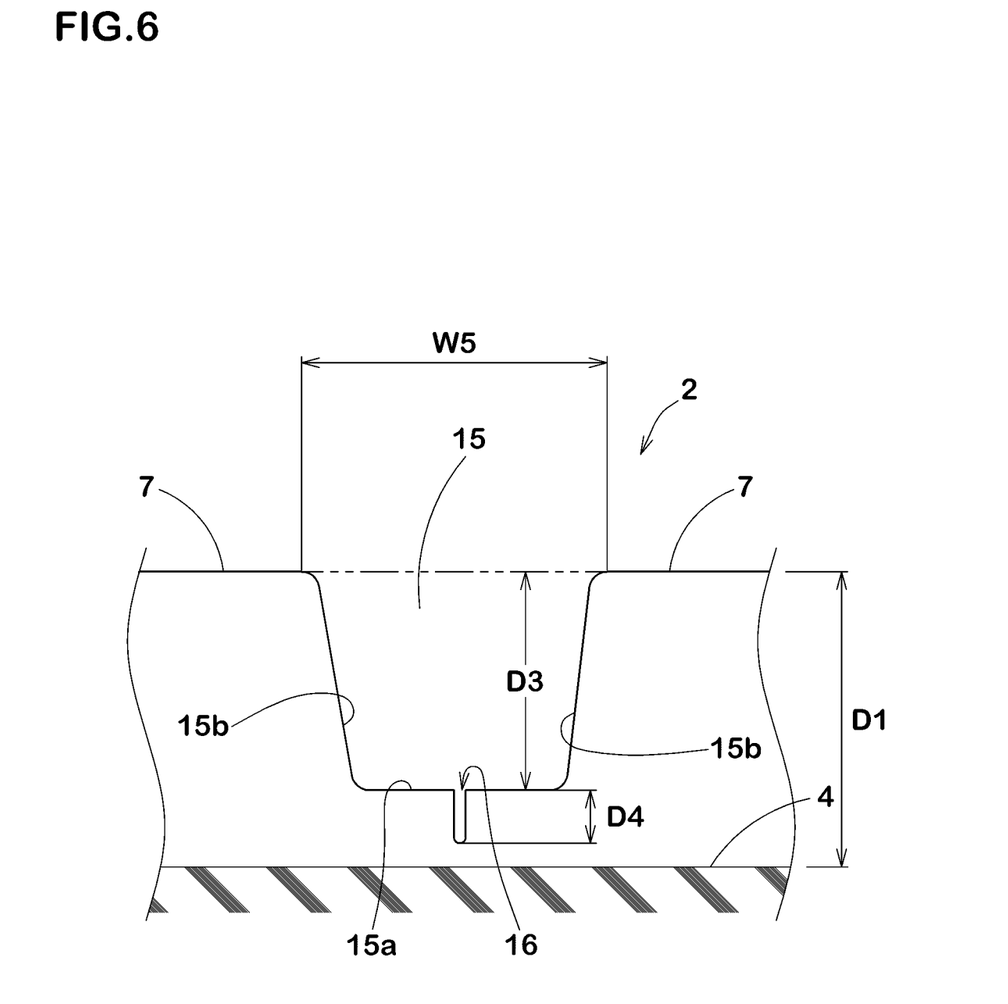
FIG. 6 is a side view of a middle portion.

FIG. 6 illustrates a cross-section of the middle lateral groove 15. As shown in FIG. 6, the middle lateral groove 15 includes a flat bottom 15a which extends in substantially parallel to the virtual top face of the tread portion 2 and a pair of walls 15b and 15b.

In this embodiment, the bottom 15a of the middle lateral groove 15 is provided with a groove bottom sipe 16. The groove bottom sipe 16 enables the middle lateral groove 15 to open widely during traveling to improve drainage performance. In this embodiment, the groove bottom sipe 16 extends in parallel to the middle lateral groove 15 and over the whole length of the middle lateral groove 15.

The groove bottom sipe 16 has a depth D4 from the bottom 15a in a range of from 40% to 60% of the depth difference D1-D3 between the middle main groove 4 and the middle lateral groove 15. When the depth D4 of the groove bottom sipe 16 is less than 40% of the depth difference D1-D3, it may be difficult to improve wet performance. When the depth D4 of the groove bottom sipe 16 is greater than 60% of the depth difference D1-D3, it may be difficult to improve uneven wear resistance.

Preferably, the middle lateral groove 15 has a width W5 greater than the width W4 (shown in FIG. 3) of the central lateral groove 9 to improve drainage performance by dispersing the water toward the middle main groove 4 smoothly. In order to ensure rigidity of the middle portion 7, the width W5 of the middle lateral groove 15 is preferably in a range of from 1.5 to 2.5 times the width W4 of the central lateral groove 9.

In the same point of view, the depth D3 of the middle lateral groove 15 is preferably smaller than the depth D2 of the central lateral groove 9. Preferably, the depth D3 of the middle lateral groove 15 is in a range of from 68% to 84% of the depth D1 of the middle main groove 4.

Referring back to FIG. 5, as described above, the middle portion 7 is separated into a plurality of middle blocks 17 each having the hexagonal shaped top face by the middle lateral groove 15. Such a middle block 17 having a hexagonal shaped top face may suppress slippage thereof against the road by elastically and moderately deforming each circumferential both end portion 17t of the middle blocks 17 when the middle block 17 comes into contact with the road. Accordingly, wear-energy to be acted on the respective end portions 17t of the middle block 17 may be reduced so that uneven wear resistance is improved. In this embodiment, the middle block 17 is formed as a plain block that is not provided with sipes nor grooves on its top face 17n.

In this embodiment, the shoulder portion 8 has the width Ws that varies periodically while increasing and decreasing in the circumferential direction of the tire. The shoulder portion 8 includes a maximum-width portion 8A and a minimum-width portion 8B, and which are alternately arranged in the circumferential direction of the tire.

The shoulder portion 8 is provided with a plurality of shoulder lateral grooves 21 to form a plurality of shoulder blocks 23 each having a polygonal top face, wherein each of the shoulder lateral grooves 21 communicates the zigzag peak 5h of the shoulder main groove 5 with the tread edge Te so that each shoulder lateral groove 21 is arranged at a location where the shoulder portion 8 has the minimum width. This structure may provide the shoulder lateral groove 21 in a short length that disperses the water through the tread edge Te effectively.

In this embodiment, each of the shoulder lateral grooves 21 includes an axially inner portion 21A having a constant width W6 and an axially outer portion 21B having a width increasing toward the tread edge Te. This configuration may be useful to further improve drainage performance. Preferably, the inner portion 21A extends in a straight manner.

Preferably, the shoulder lateral groove 21 has an angle θ8 smaller than the angle θ7 of the middle lateral groove 15 to suppress uneven wear such as shoulder wear. The shoulder lateral groove 21 preferably has the angle θ8 in a range of not more than 5 degrees, more preferably not more than 2 degrees with respect to the axial direction of the tire.

In this embodiment, the angle θ8 of the shoulder lateral groove 21 is set smaller than the angle θ7 of the middle lateral groove 15, and the angle θ7 of the middle lateral groove 15 is set smaller than the angle θ5 of the central lateral groove 9. Accordingly, rigidity of tread blocks 11, 17 and 23 tends to be enhanced toward the shoulder portion 8 from the central portion 6. This configuration makes it possible to improve uneven wear resistance in a well balanced manner.

Preferably, the shoulder lateral groove 21 has the width W6 in average in a range of from 80% to 120% of the width W5 of the middle lateral groove 15 in order to improve uneven wear resistance while ensuring drainage performance. In the same point of view, the shoulder lateral groove 21 preferably has a depth (not shown) smaller than the depth D2 of the middle lateral groove 15. More preferably, the depth of the shoulder lateral groove 21 is in a range of from 16% to 32% of the depth of the shoulder main groove 5.

As described above, the shoulder portion 8 is separated into a plurality of shoulder blocks 23 each having the polygonal shaped top face by the shoulder lateral grooves 21. Such a shoulder block 23 having a polygonal shaped top face may suppress slippage thereof against the road by elastically and moderately deforming each circumferential both end portion of the shoulder blocks 23 when the shoulder block 23 comes into contact with the road. Accordingly, wear-energy to be acted on the respective end portions of the shoulder block 23 may be reduced so that uneven wear resistance is improved. In this embodiment, the shoulder block 23 is formed as a plain block that is not provided with sipes nor grooves on its top face 23n.

In this embodiment, a total "LA" that is the sum of each maximum axial width WC of the central portions 6 and 6, each maximum axial width WM of the middle portions 7 and 7, each maximum axial width WS of the shoulder portions 8 and 8, a maximum axial length WL of the central sipe 13 provided on one of the central portions 6, and a maximum axial length WL of the central sipe 13 provided on the other one of the central portions 6 is in a range of from 1.05 to 1.31 times the tread width. In other words, the above technical feature will be expressed as the following equation:

$$1.05 \leq LA/TW \leq 1.31,$$

where $LA = WC1 + WC2 + WM1 + WM2 + WS1 + WS2 + WL1 + WL2$, and wherein the suffixes 1 and 2 mean the width or length on the left side and right side of the tire equator, respectively.

Preferably, the tread portion 2 may has a land ratio in a range of from 70% to 82%, more preferably in a range of from 73% to 79% in order to further improve the advantageous effects.

While the particularly preferable embodiments of the non-pneumatic tire in accordance with the present invention have been described in detail, the present invention is not limited to the illustrated embodiments, but can be modified and carried out in various aspects.

EXAMPLE

Heavy duty pneumatic tires having a size of 275/80R22.5 and the tread pattern shown in FIG. 1 were manufactured based on the details of Table 1, and then uneven wear resistance and wet performance thereof were tested. The common specifications of tires are as follows.
Tread width TW: 231 mm
Depths of main grooves: 16.5 mm
Angle of middle lateral grooves θ7: 10 degrees
The test method is as follows.
Uneven Wear Resistance Test (Heel and Toe Wear Test):
Each test tire was installed to a 2-D type truck having a capacity load of 10 ton as its whole wheels under the following conditions, and then the truck was traveled on a dry asphalt test course for 60,000 km.
Rim: 22.5×7.5
Internal pressure: 900 kPa
Load: 5 ton (placed forward the platform)
After traveling, the amount of uneven wear of the rear side tire was measured. The measurement of the amount of uneven wear was done by measuring a wear difference between circumferential both end portions of eight blocks chosen arbitrary from the respective central, middle and shoulder portions. The results were evaluated by the average amount of uneven wear. The smaller the value, the better the performance is.
Wet Performance Test:
The test driver drove the truck on a wet asphalt road with a puddle 5 mm deep to evaluate steering response, cornering stability, traction and grip by the driver's feeling. The test results were shown using a score based on Ex. 1 being 100. More than 20 points difference means remarkable performance-difference, and more than 10 points difference means obvious performance-difference. The larger the value, the better the wet performance is.

Test results are shown in Table 1. From the test results, it was confirmed that Example tires in accordance with the present invention can be improved uneven wear resistance as well as wet performance in a well balanced manner. Furthermore, the same results were confirmed on the other tests for different tire size.

TABLE 1

Figure 7:
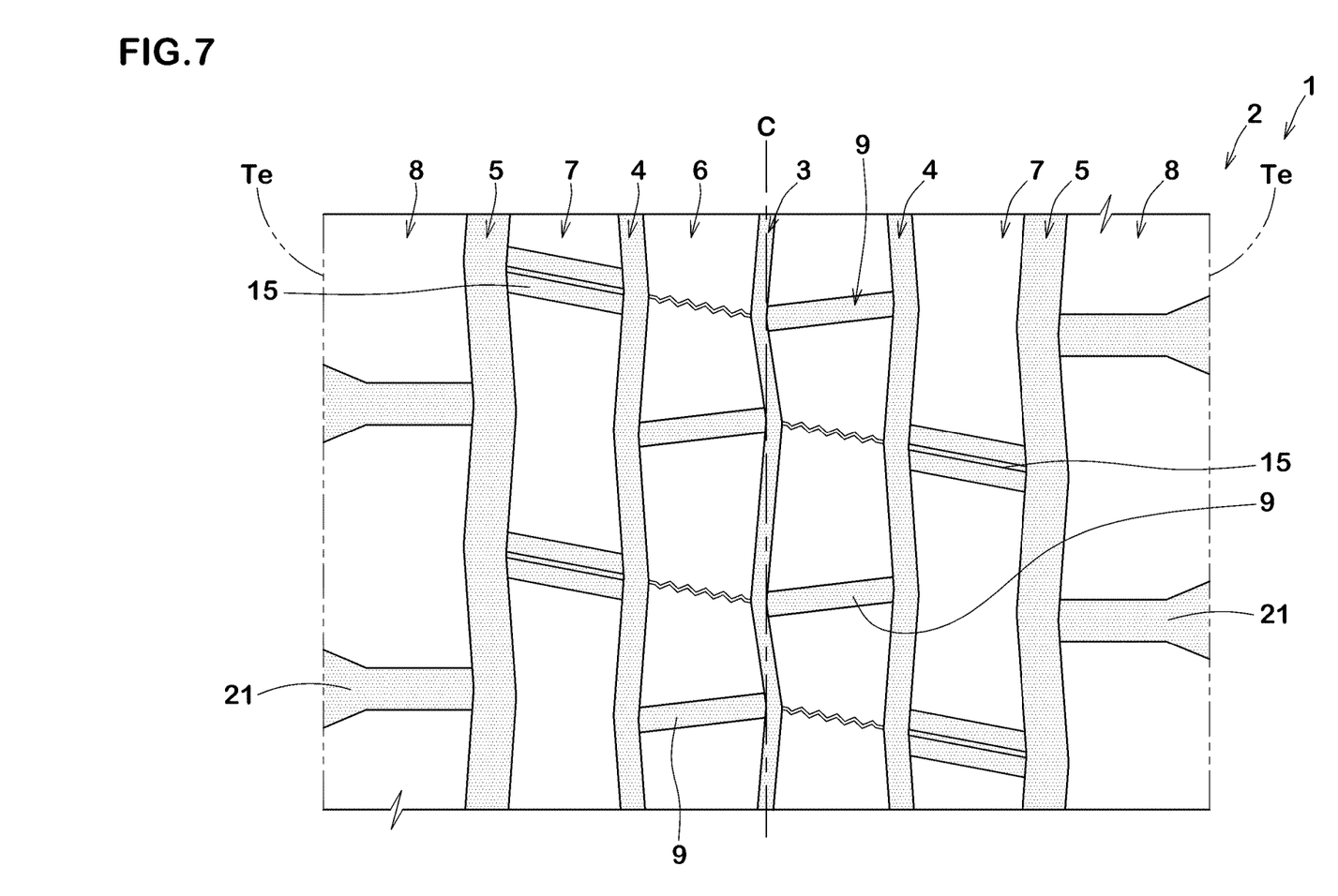
FIG. 7 is a development view of a tread portion in accordance with a comparative example.

| | Ref. 1 | Ex. 1 | Ref. 2 | Ex. 2 | Ex. 3 | Ref. 3 | Ex. 4 | Ex. 5 | Ex. 6 | Ex. 7 | Ex. 8 |
|---|---|---|---|---|---|---|---|---|---|---|---|
| Tread pattern | FIG. 7 | FIG. 1 | FIG. 1 | FIG. 1 | FIG. 1 | FIG. 1 | FIG. 1 | FIG. 1 | FIG. 1 | FIG. 1 | FIG. 1 |
| Ratio LA/TW | 1.18 | 1.18 | 0.95 | 1.05 | 1.31 | 1.41 | 1.18 | 1.18 | 1.18 | 1.18 | 1.18 |
| Central sipe depth/middle lateral groove depth (%) | 88 | 88 | 88 | 88 | 88 | 88 | 76 | 80 | 96 | 100 | 88 |
| Ratio D4/(D1−D3) (%) | 50 | 50 | 50 | 50 | 50 | 50 | 50 | 50 | 50 | 50 | 30 |
| Ratio W2/W1 | 2 | 2 | 2 | 2 | 2 | 2 | 2 | 2 | 2 | 2 | 2 |
| Ratio W3/W1 | 3 | 3 | 3 | 3 | 3 | 3 | 3 | 3 | 3 | 3 | 3 |
| Ratio D2/D1 (%) | 94 | 94 | 94 | 94 | 94 | 94 | 94 | 94 | 94 | 94 | 94 |
| Ratio D3/D1 (%) | 72 | 72 | 72 | 72 | 72 | 72 | 72 | 72 | 72 | 72 | 72 |
| Shoulder lateral groove depth/shoulder main groove depth (%) | 24 | 24 | 24 | 24 | 24 | 24 | 24 | 24 | 24 | 24 | 24 |
| Wet performance (Score) | 80 | 100 | 85 | 95 | 100 | 103 | 90 | 95 | 100 | 105 | 95 |
| Uneven wear resistance (mm) | 4 | 1 | 1.5 | 1.8 | 2 | 3.5 | 0.9 | 0.9 | 1.2 | 1.7 | 1 |

| | Ex. 9 | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 | FIG. 1 | FIG. 1 | FIG. 1 |
| Ratio LA/TW | 1.18 | 1.18 | 1.18 | 1.18 | 1.18 | 1.18 | 1.18 | 1.18 | 1.18 | 1.18 | 1.18 |
| Central sipe depth/middle lateral groove depth (%) | 88 | 88 | 88 | 88 | 88 | 88 | 88 | 88 | 88 | 88 | 88 |
| Ratio D4/(D1−D3) (%) | 40 | 60 | 70 | 50 | 50 | 50 | 50 | 50 | 50 | 50 | 50 |
| Ratio W2/W1 | 2 | 2 | 2 | 1 | 1.5 | 3 | 3.5 | 2 | 2 | 2 | 2 |

TABLE 1-continued

|  |  |  |  |  |  |  |  |  |  |  |  |
|---|---|---|---|---|---|---|---|---|---|---|---|
| Ratio W3/W1 | 3 | 3 | 3 | 3 | 3 | 3 | 3 | 2 | 2.5 | 4.5 | 5 |
| Ratio D2/D1 (%) | 94 | 94 | 94 | 94 | 94 | 94 | 94 | 94 | 94 | 94 | 94 |
| Ratio D3/D1 (%) | 72 | 72 | 72 | 72 | 72 | 72 | 72 | 72 | 72 | 72 | 72 |
| Shoulder lateral groove depth/shoulder main groove depth (%) | 24 | 24 | 24 | 24 | 24 | 24 | 24 | 24 | 24 | 24 | 24 |
| Wet performance (Score) | 100 | 100 | 105 | 90 | 95 | 100 | 105 | 90 | 100 | 100 | 105 |
| Uneven wear resistance (mm) | 1 | 1.2 | 1.5 | 0.8 | 1 | 1.5 | 2 | 0.8 | 1 | 1.5 | 2 |

|  | Ex. 20 | Ex. 21 | Ex. 22 | Ex. 23 | Ex. 24 | Ex. 25 | Ex. 26 | Ex. 27 | Ex. 28 | Ex. 29 | Ex. 30 | Ex. 31 |
|---|---|---|---|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 | FIG. 1 | FIG. 1 | FIG. 1 | FIG. 1 |
| Ratio LA/TW | 1.18 | 1.18 | 1.18 | 1.18 | 1.18 | 1.18 | 1.18 | 1.18 | 1.18 | 1.18 | 1.18 | 1.18 |
| Central sipe depth/middle lateral groove depth (%) | 88 | 88 | 88 | 88 | 88 | 88 | 88 | 88 | 88 | 88 | 88 | 88 |
| Ratio D4/(D1-D3) (%) | 50 | 50 | 50 | 50 | 70 | 50 | 50 | 50 | 50 | 50 | 50 | 50 |
| Ratio W2/W1 | 2 | 2 | 2 | 2 | 2 | 1 | 1.5 | 3 | 3.5 | 2 | 2 | 2 |
| Ratio W3/W1 | 3 | 3 | 3 | 3 | 3 | 3 | 3 | 3 | 3 | 2 | 2.5 | 4.5 |
| Ratio D2/D1 (%) | 88 | 90 | 98 | 100 | 94 | 94 | 94 | 94 | 94 | 94 | 94 | 94 |
| Ratio D3/D1 (%) | 72 | 72 | 72 | 72 | 64 | 68 | 84 | 88 | 72 | 72 | 72 | 72 |
| Shoulder lateral groove depth/shoulder main groove depth (%) | 24 | 24 | 24 | 24 | 24 | 24 | 24 | 24 | 8 | 16 | 32 | 40 |
| Wet performance (Score) | 90 | 95 | 100 | 105 | 95 | 100 | 100 | 105 | 95 | 100 | 100 | 100 |
| Uneven wear resistance (mm) | 0.8 | 1 | 1 | 1.5 | 1 | 1 | 1 | 1.5 | 1 | 1 | 1.5 | 2 |

What is claimed is:

1. A heavy duty pneumatic tire comprising:
a tread portion being provided with a circumferentially extending zigzag central main groove on a tire equator, a pair of circumferentially extending zigzag middle main grooves each located axially outwardly of the central main groove and a pair of circumferentially extending zigzag shoulder main grooves each located axially outwardly of each middle main groove to form a pair of central portions each between the central main groove and one of the middle main grooves, a pair of middle portions each between the middle main groove and the shoulder main groove on each side of the tire equator, and a pair of shoulder portions each between the shoulder main groove and a tread edge on each side of the tire equator, wherein each of the central portions, middle portions and shoulder portions has an axial width varying periodically while increasing and decreasing in a circumferential direction of the tire;
each of the central portions being provided with a plurality of central lateral grooves to form a plurality of central blocks each having a hexagonal shaped top face, wherein each of the central lateral grooves communicates a zigzag peak of the central main groove with a zigzag peak of the middle main groove so that each central lateral groove is arranged at a location where the central portion has a minimum width;
each of the middle portions being provided with a plurality of middle lateral grooves to form a plurality of middle blocks each having a hexagonal shaped top face, wherein each of the middle lateral grooves communicates a zigzag peak of the middle main groove with a zigzag peak of the shoulder main groove so that each middle lateral groove is arranged at a location where the middle portion has a minimum width;
each of the shoulder portions being provided with a plurality of shoulder lateral grooves to form a plurality of shoulder blocks each having a polygonal top face, wherein each of the shoulder lateral grooves communicates a zigzag peak of the shoulder main groove with the tread edge so that each shoulder lateral groove is arranged at a location where the shoulder portion has a minimum width;
each central block being provided with a central sipe extending in an axial direction of the tire; and
a total that is the sum of each maximum axial width of the central portions, each maximum axial width of the middle portions, each maximum axial width of the shoulder portions, a maximum axial length of the central sipe provided on one of the central portions, and a maximum axial length of the central sipe provided on the other one of the central portions being in a range of from 1.05 to 1.18 times a tread width.

2. A heavy duty pneumatic tire comprising:
a tread portion being provided with a circumferentially extending zigzag central main groove on a tire equator, a pair of circumferentially extending zigzag middle main grooves each located axially outwardly of the central main groove and a pair of circumferentially extending zigzag shoulder main grooves each located axially outwardly of each middle main groove to form a pair of central portions each between the central main groove and one of the middle main grooves, a pair of middle portions each between the middle main groove and the shoulder main groove on each side of the tire equator, and a pair of shoulder portions each between the shoulder main groove and a tread edge on each side of the tire equator, wherein each of the central portions, middle portions and shoulder portions has an axial width varying periodically while increasing and decreasing in a circumferential direction of the tire;
each central main groove comprising a long inclined portion and a short inclined portion inclined in an opposite direction to the long inclined portion, and the long inclined portion and the short inclined portion being arranged alternately in a circumferential direction of the tire;
each of the central portions being provided with a plurality of central lateral grooves to form a plurality of central blocks each having a hexagonal shaped top face, wherein each of the central lateral grooves communicates a zigzag peak of the central main groove with a zigzag peak of the middle main groove so that each central lateral groove is arranged at a location where the central portion has a minimum width;
each of the middle portions being provided with a plurality of middle lateral grooves to form a plurality of middle blocks each having a hexagonal shaped top face, wherein each of the middle lateral grooves communicates a zigzag peak of the middle main groove with a zigzag peak of the shoulder main groove so that each middle lateral groove is arranged at a location where the middle portion has a minimum width, wherein the zigzag peak of the middle main groove comprises an outer peak protruding axially outwardly;

each of the shoulder portions being provided with a plurality of shoulder lateral grooves to form a plurality of shoulder blocks each having a polygonal top face, wherein each of the shoulder lateral grooves communicates a zigzag peak of the shoulder main groove with the tread edge so that each shoulder lateral groove is arranged at a location where the shoulder portion has a minimum width;

each central block being provided with a central sipe extending in an axial direction of the tire, and the central sipe communicating the long inclined portion of the central main groove with the outer peak of the middle main groove; and a total that is the sum of each maximum axial width of the central portions, each maximum axial width of the middle portions, each maximum axial width of the shoulder portions, a maximum axial length of the central sipe provided on one of the central portions, and a maximum axial length of the central sipe provided on the other one of the central portions being in a range of from 1.05 to 1.18 times a tread width.

3. The heavy duty pneumatic tire according to claim 2, wherein the central sipe has a depth in a range of from 80% to 96% of a depth of the middle main groove.

4. The heavy duty pneumatic tire according to claim 2, wherein at least one of the middle lateral grooves has a bottom provided with a bottom sipe, and the sipe has a depth in a range of from 40% to 60% of a depth difference between the middle lateral groove and the middle main groove.

5. The heavy duty pneumatic tire according to claim 4, wherein the bottom sipe extends in the entire length of the at least one of the middle lateral grooves.

6. The heavy duty pneumatic tire according to claim 2, wherein the central lateral grooves have a depth greater than a depth of the middle lateral grooves, and the depth of the middle lateral grooves is greater than a depth of the shoulder lateral grooves.

7. The heavy duty pneumatic tire according to claim 2, wherein the central main groove has a width smaller than a width of the middle main groove, and the width of the middle main groove is smaller than a width of the shoulder main groove.

8. The heavy duty pneumatic tire according to claim 2, wherein the middle main grooves have an angle of from 2 to 8 degrees with respect to a circumferential direction of the tire.

9. The heavy duty pneumatic tire according to claim 2, wherein each central lateral groove has a depth in a range of from 90% to 98% of a depth of the middle main groove, each middle lateral groove has a depth in a range of from 68% to 84% of the depth of the middle main groove, and each shoulder lateral groove has a depth in a range of from 16% to 32% of a depth of the shoulder main groove.

10. The heavy duty pneumatic tire according to claim 2, wherein the long inclined portion has an angle $\theta 1$ in a range of from 0.5 to 6.5 degrees with respect to the circumferential direction of the tire.

11. The heavy duty pneumatic tire according to claim 10, wherein the short inclined portion has an angle $\theta 2$ in a range of from 5 to 15 degrees with respect to the circumferential direction of the tire.

12. The heavy duty pneumatic tire according to claim 11, wherein a circumferential length (L1) of the long inclined portion is in a range of from 1.3 to 2.3 times a circumferential length (L2) of the short inclined portion.

13. The heavy duty pneumatic tire according to claim 12, wherein a groove width (W1) of the central main groove is in a range of from 0.5% to 3% of the tread width.

14. The heavy duty pneumatic tire according to claim 11, wherein a groove width (W1) of the central main groove is in a range of from 0.5% to 3% of the tread width.

15. The heavy duty pneumatic tire according to claim 2, wherein the short inclined portion has an angle $\theta 2$ in a range of from 5 to 15 degrees with respect to the circumferential direction of the tire.

16. The heavy duty pneumatic tire according to claim 2, wherein a circumferential length (L1) of the long inclined portion is in a range of from 1.3 to 2.3 times a circumferential length (L2) of the short inclined portion.

17. The heavy duty pneumatic tire according to claim 2, wherein a groove width (W1) of the central main groove is in a range of from 0.5% to 3% of the tread width.

* * * * *